(12) United States Patent
Baek et al.

(10) Patent No.: US 11,694,306 B2
(45) Date of Patent: Jul. 4, 2023

(54) IMAGE PROCESSING APPARATUS AND METHOD OF OPERATING THE SAME

(71) Applicant: SAMSUNG ELECTRONICS CO., LTD., Suwon-si (KR)

(72) Inventors: Sangwook Baek, Suwon-si (KR); Yongsup Park, Suwon-si (KR); Sangmi Lee, Suwon-si (KR); Youngo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 240 days.

(21) Appl. No.: 17/240,360

(22) Filed: Apr. 26, 2021

(65) Prior Publication Data

US 2021/0390660 A1 Dec. 16, 2021

(30) Foreign Application Priority Data

Jun. 12, 2020 (KR) .................. 10-2020-0071913
Oct. 8, 2020 (KR) .................. 10-2020-0130458

(51) Int. Cl.
*G06T 5/00* (2006.01)
*G06T 3/40* (2006.01)
*G06N 3/0464* (2023.01)
*G06N 3/045* (2023.01)

(52) U.S. Cl.
CPC ............ *G06T 5/001* (2013.01); *G06N 3/045* (2023.01); *G06N 3/0464* (2023.01); *G06T 3/4046* (2013.01); *G06T 3/4053* (2013.01); *G06T 2207/20084* (2013.01)

(58) Field of Classification Search
CPC .......... G06T 5/00; G06T 5/001; G06T 5/002; G06T 5/003; G06T 5/004; G06T 5/005; G06T 5/007; G06T 5/008; G06T 5/009; G06T 5/10; G06T 5/20;
(Continued)

(56) References Cited

U.S. PATENT DOCUMENTS 9,799,098 B2 10/2017 Seung et al.
10,325,352 B1 6/2019 Kim et al.
10,540,768 B2 1/2020 Yoo et al.
(Continued)

FOREIGN PATENT DOCUMENTS

CN 107749052 A 3/2018
CN 109146061 A 1/2019
(Continued)

OTHER PUBLICATIONS

Hu, Yanting, et al. "Channel-wise and Spatial Feature Modulation Network for Single Image Super-Resolution." arXiv preprint arXiv:1809.11130v1 (2018). (Year: 2018).*
(Continued)

*Primary Examiner* — Geoffrey E Summers
(74) *Attorney, Agent, or Firm* — Sughrue Mion, PLLC

(57) ABSTRACT

An image processing apparatus for performing image quality processing on an image includes a feature extraction network and an image quality processing network including one or more modulation blocks, wherein each of the one or more modulation blocks includes a convolution layer, a modulation layer, and an activation layer for processing the image.

20 Claims, 14 Drawing Sheets

(58) Field of Classification Search
CPC . G06T 2207/20081; G06T 2207/20084; G06T 3/4046; G06T 3/4053; G06N 3/02–0985
See application file for complete search history.

(56) References Cited

U.S. PATENT DOCUMENTS

| | | | |
|---|---|---|---|
| 10,630,996 | B2 | 4/2020 | Wang et al. |
| 11,164,340 | B2 | 11/2021 | Lee et al. |
| 2018/0075581 | A1 | 3/2018 | Shi et al. |
| 2018/0365794 | A1 | 12/2018 | Lee et al. |
| 2020/0118249 | A1 | 4/2020 | Kim |
| 2020/0184627 | A1 | 6/2020 | Otroshi Shahreza et al. |
| 2021/0118095 | A1 | 4/2021 | Kim et al. |
| 2021/0150287 | A1 | 5/2021 | Baek et al. |
| 2021/0400231 | A1 | 12/2021 | Park et al. |

FOREIGN PATENT DOCUMENTS

| | | |
|---|---|---|
| CN | 111191674 A | 5/2020 |
| CN | 111242846 A | 6/2020 |
| CN | 111340744 A | 6/2020 |
| KR | 10-2020-0045740 A | 5/2020 |
| KR | 10-2021-0045828 A | 4/2021 |
| KR | 10-2021-0050186 A | 5/2021 |
| KR | 10-2269034 B1 | 6/2021 |

OTHER PUBLICATIONS

He, Jingwen, Chao Dong, and Yu Qiao. "Multi-Dimension Modulation for Image Restoration with Dynamic Controllable Residual Learning." arXiv preprint arXiv:1912.05293v1 (2019). (Year: 2019).*

Communication dated Jun. 24, 2022 issued by the International Searching Authority in counterpart Application No. PCT/KR2022/004156 (PCT/ISA/220, PCT/ISA/210, and PCT/ISA/237).

Wang et al., "Recovering Realistic Texture in Image Super-resolution by Deep Spatial Feature Transform," Apr. 2018, Total 10 pages.

Wang et al., "ESRGAN: Enhanced Super-Resolution Generative Adversarial Networks," arXiv:1809.00219v2, Sep. 2018, Total 23 pages.

Yang, L., et al., "HiFaceGAN: Face Renovation via Collaborative Suppression and Replenishment", arXiv:2005.05005v1 [cs.CV], May 11, 2020, 10 pages.

Park, J., et al., "Distort-and-Recover: Color Enhancement using Deep Reinforcement Learning", arXiv:1804.04450v2 [cs.CV], Apr. 16, 2018, 9 pages.

Park, T., et al., "Semantic Image Synthesis with Spatially-Adaptive Normalization", arXiv:1903.07291v2 [cs.CV], Nov. 5, 2019, pp. 1-19.

Dalal, N., et al., "Histograms of Oriented Gradients for Human Detection", Jun. 2005, 8 pages.

Sheikh, H., et al., "Image Information and Visual Quality", Feb. 2006, 4 pages.

Wang, X., et al., "Recovering Realistic Texture in Image Super-resolution by Deep Spatial Feature Transform", Computer Vision Foundation, Apr. 2018, pp. 606-615.

Lim, B., et al., "Enhanced Deep Residual Networks for Single Image Super-Resolution", Computer Vision Foundation, Jul. 2017, pp. 136-144.

Wang, X., et al., "Deep Network Interpolation for Continuous Imagery Effect Transition", Computer Vision Foundation, Nov. 2018, pp. 1692-1701.

He, J., et al., "Modulating Image Restoration with Continual Levels via Adaptive Feature Modification Layers", arXiv:1904.08118v3 [cs.CV], Jun. 3, 2019, 9 pages.

Chunbao Li et al., "Adaptive Weighted CNN Features Integration for Correlation Filter Tracking", IEEE Access, vol. 7, Jun. 2019, 14 pages total.

Xingjian Li et al., "DELTA: Deep Learning Transfer Using Feature Map With Attention for Convolutional Networks", arXiv:1901.09229v1, Jan. 2019, 15 pages total.

Communication dated Jul. 29, 2021 issued by the International Searching Authority in counterpart Application No. PCT/KR2021/005020 (PCT/ISA/220, PCT/ISA/210, and PCT/ISA/237).

\* cited by examiner

IMAGE PROCESSING APPARATUS AND METHOD OF OPERATING THE SAME

CROSS-REFERENCE TO RELATED APPLICATIONS

This application is based on and claims priority under 35 U.S.C. § 119 to Korean Patent Application Nos. 10-2020-0071913, filed on Jun. 12, 2020, and 10-2020-0130458, filed on Oct. 8, 2020, in the Korean Intellectual Property Office, the disclosures of which are incorporated herein by reference in their entireties.

BACKGROUND

1. Field

The disclosure relates to an image processing apparatus for performing image quality processing on an image by using a neural network, and a method of operating the image processing apparatus for performing image quality processing on an image by using a neural network.

2. Description of the Related Art

With the development of computer technology, data traffic has increased exponentially, and artificial intelligence (AI) has become an important trend leading future innovation. Because AI emulates the way people think, artificial intelligence may be practically applied in infinite ways to all industries. Representative AI technologies include pattern recognition, machine learning, expert systems, neural networks, and natural language processing.

Neural networks model characteristics of human biological neurons via mathematical expressions, and use an algorithm that emulates the ability of humans to learn. Through this algorithm, neural networks are able to generate mappings between input data and output data, and the capability of generating and evolving such mappings may be referred to as the learning capability of a neural network. Also, neural networks have a generalization capability of generating correct output data based on input data that is not used for learning, based on learned results.

When image quality processing (e.g., denoising or noise removal) is performed on an image by using a deep neural network (e.g., a deep-layered convolutional neural network (CNN)), adaptive processing may be performed according to local characteristics of pixels. However, when the number of layers included in the CNN is reduced due to constraints on the number of operations, there is a problem in that the performance of adaptive processing may be degraded.

SUMMARY

Provided are an image processing apparatus capable of performing image quality processing by using a convolutional neural network, and a method of operating the image processing apparatus for performing image quality processing by using a convolutional neural network.

Additional aspects will be set forth in part in the description which follows and, in part, will be apparent from the description, or may be learned by practice of the presented embodiments of the disclosure.

According to an embodiment of the disclosure, an image processing apparatus includes a memory storing one or more instructions, and a processor configured to execute the one or more instructions stored in the memory to extract feature information of an input image by using a feature extraction network, and generate an output image by processing the input image, by using an image quality processing network comprising one or more modulation blocks, wherein each modulation block among the one or more modulation blocks includes a convolution layer configured to perform a convolution operation between an image that is input to the convolution layer and a kernel in the convolution layer and output a feature map based on the convolution operation, a modulation layer arranged to receive the feature map output from the convolution layer as input and generate a modulated feature map by modulating the feature map based on the feature information of the input image, and an activation layer arranged to receive the modulated feature map and generate the output image by applying an activation function to the modulated feature map.

The feature information extracted by the feature extraction network may include at least one of edge information of the input image, shadow area information of the input image, luminance information of the input image, transform noise information of the input image, or texture information of the input image.

Each of the one or more modulation blocks may further include a weighted map generator corresponding to the modulation layer, wherein the weighted map generator may be configured to generate one or more weighted maps, based on the feature information, wherein the processor may be further configured to execute the one or more instructions to, in the modulation layer, generate the modulated feature map by applying the one or more weighted maps to the feature map.

The weighted map generator may be further configured to generate the one or more weighted maps by performing a convolution operation and an activation function operation on the feature information of the input image.

The one or more weighted maps may include a first weighted map and a second weighted map, wherein the processor may be further configured to execute the one or more instructions to, in the modulation layer, generate the modulated feature map by performing a first operation between the feature map and the first weighted map and performing a second operation between a result of the first operation and the second weighted map.

The first operation may be a multiplication operation and the second operation may be an addition operation.

Each of the one or more modulation blocks may further include a plurality of convolution layers, and a skip connection configured to skip image processing of the input image by one or more convolution layers among the plurality of convolution layers.

Each of the one or more feature extraction blocks may include a plurality of convolution layers arranged to serially provide output as input to a next convolution layer among the plurality of convolution layers, and a skip connection configured to skip one or more convolution layers from among the plurality of convolution layers.

Each of the one or more feature extraction blocks may further include a residual scaler configured to adjust sizes of values subject to the skip connection, and a normalization layer configured to adjust a range of result values of convolution operations performed in the plurality of convolution layers.

Each of the one or more feature extraction blocks may further include a first convolution layer and a second convolution layer, wherein the skip connection may be further configured to connect an input of the first convolution layer to an output of the second convolution layer.

The processor may be further configured to execute the one or more instructions to generate an upscaled feature map by up-scaling the modulated feature map output from each modulation block of the one or more modulation blocks, and generate the output image based on the upscaled feature map.

According to another embodiment of the disclosure, a method of operating an image processing apparatus includes extracting feature information of an input image using a feature extraction network, and generating an output image by processing the input image, by using an image quality processing network comprising one or more modulation blocks, wherein each of the one or more modulation blocks includes a convolution layer performing a convolution operation between an image that is input to the convolution layer and a kernel in the convolution layer and output a feature map based on the convolution operation, a modulation layer receiving the feature map output from the convolution layer as input and generating a modulated feature map by modulating the feature map based on the feature information of the input image, and an activation layer receiving the modulated feature map and generating the output image by applying an activation function to the modulated feature map.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
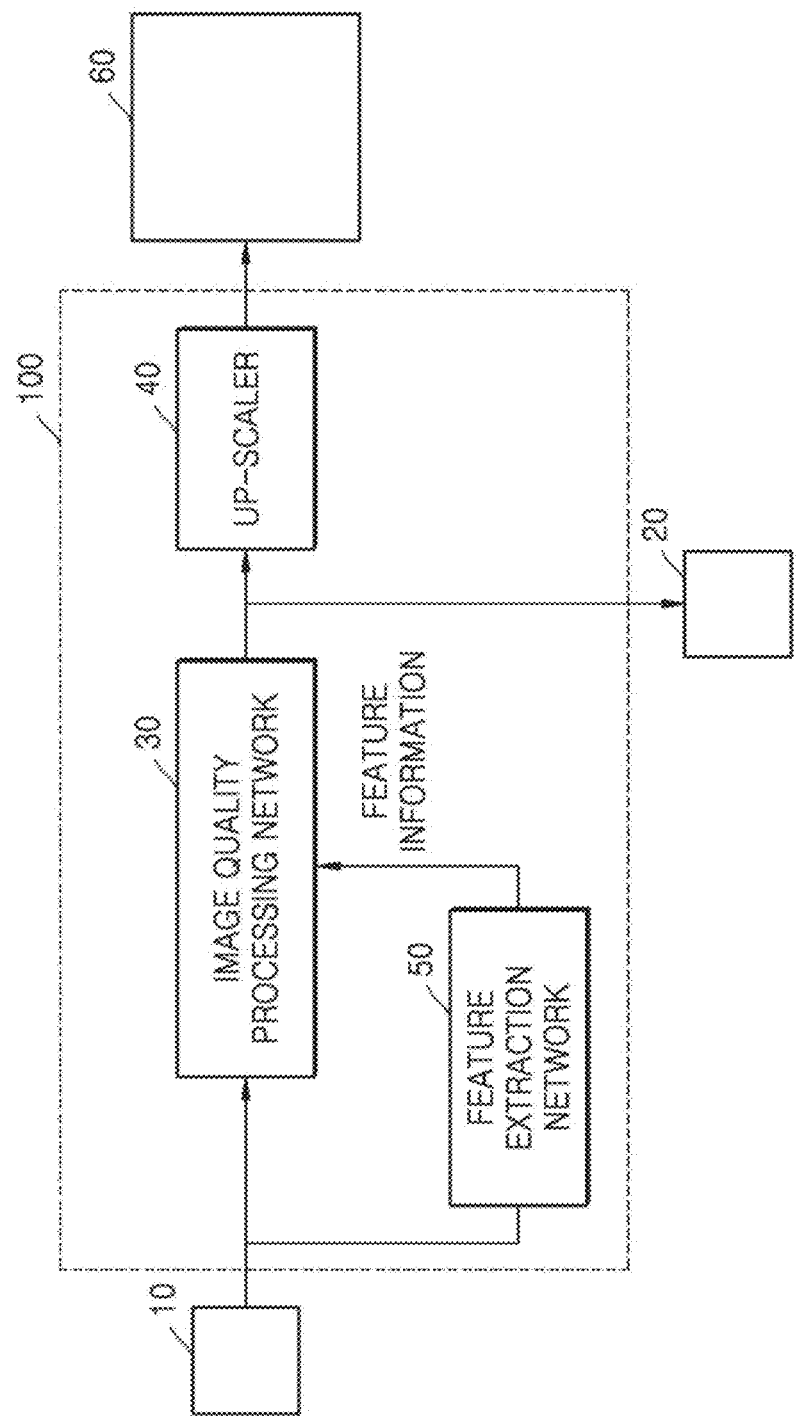
FIG. 1 is a diagram showing an operation, performed by an image processing apparatus, of processing an image by using one or more networks, according to an embodiment of the disclosure.

Some terms used in the specification may be defined, and embodiments of the disclosure will be described in detail.

The terms used herein are those general terms currently widely used in the art in consideration of functions regarding the disclosure. However, the terms may vary according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

When a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or embodied by combining hardware and software.

Throughout the disclosure, the expression "at least one of a, b or c" indicates only a, only b, only c, both a and b, both a and c, both b and c, all of a, b, and c, and variations thereof.

Hereinafter, embodiments of the disclosure will be described in detail with reference to the accompanying drawings such that one of ordinary skill in the art may easily implement the embodiments of the disclosure. However, the embodiments of the disclosure may be implemented in many different forms and are not limited to those described herein. In the drawings, parts that are not related to the description are omitted for clear description of the disclosure, and like reference numerals in the drawings denote like or similar elements throughout the specification.

FIG. 1 is a diagram showing an operation, performed by an image processing apparatus, of processing an image by using one or more networks, according to an embodiment of the disclosure.

The image processing apparatus 100 according to an embodiment of the disclosure may be implemented as any of electronic apparatuses such as a mobile phone, a tablet personal computer (PC), a digital camera, a camcorder, a laptop computer, a desktop computer, an e-book reader, a digital broadcast terminal, a personal digital assistant (PDA), a portable multimedia player (PMP), a navigation device, an MP3 player, an Internet protocol television (IPTV), a digital television (DTV), and a wearable device.

Referring to FIG. 1, the image processing apparatus 100 according to an embodiment of the disclosure may process an image by using an image quality processing network 30 and a feature extraction network 50. For example, the image quality processing network 30 according to an embodiment of the disclosure may receive a first image 10 and generate a second image 20 by processing the first image 10. In this regard, the feature extraction network 50 according to an embodiment of the disclosure may receive the first image 10 and extract feature information from the first image 10 and may transmit one or more pieces of extracted feature information to the image quality processing network 30. By using feature information as input received from the feature extraction network 50, the image quality processing network 30 may perform processing for improving image quality of the first image 10.

The first image 10 according to an embodiment of the disclosure may be an image obtained by decompressing a compressed image. The image or the compressed image may be an original image. The image quality processing network 30 may remove compression artifacts included in the first image 10 and may increase resolution of the first image 10.

In addition, the image quality processing network 30 may restore structure information, such as edge information of one or more edges, and detailed texture information of an original image. However, the image quality processing is not limited thereto, and the image quality processing network 30 may perform various types of image quality processing. Accordingly, the second image 20 with improved image quality may be generated by the image quality processing network 30.

In addition, the image processing apparatus 100 according to an embodiment of the disclosure may further include an up-scaler 40 for performing up-scaling on the second image 20. The up-scaler 40 may generate a third image 60 by up-scaling the second image 20 output from the image quality processing network 30. For example, when the first image 10 is an image obtained by decompressing an image compressed by downscaling an original image, the image processing apparatus 100 may perform up-scaling on the second image 20. In some embodiments of the disclosure, the image processing apparatus 100 may not include the up-scaler 40 or may have a structure in which the up-scaler 40 is included in the image quality processing network 30.

In a configuration, the up-scaler 40 may perform up-scaling on the first image 10 before image quality processing is performed by the image quality processing network 30. As a result, image quality processing may be performed on an up-scaled image, and thus, the number of operations may increase. Accordingly, the up-scaler 40 of the image processing apparatus 100 according to an embodiment of the disclosure may receive the output of the image quality processing network 30 to up-scale an image on which image quality processing has been performed, thereby decreasing the number of operations. However, the disclosure is not limited thereto.

An image processing operation performed in the image quality processing network 30 and the feature extraction network 50 according to an embodiment of the disclosure will be described in detail below with reference to the drawings.

Figure 2:
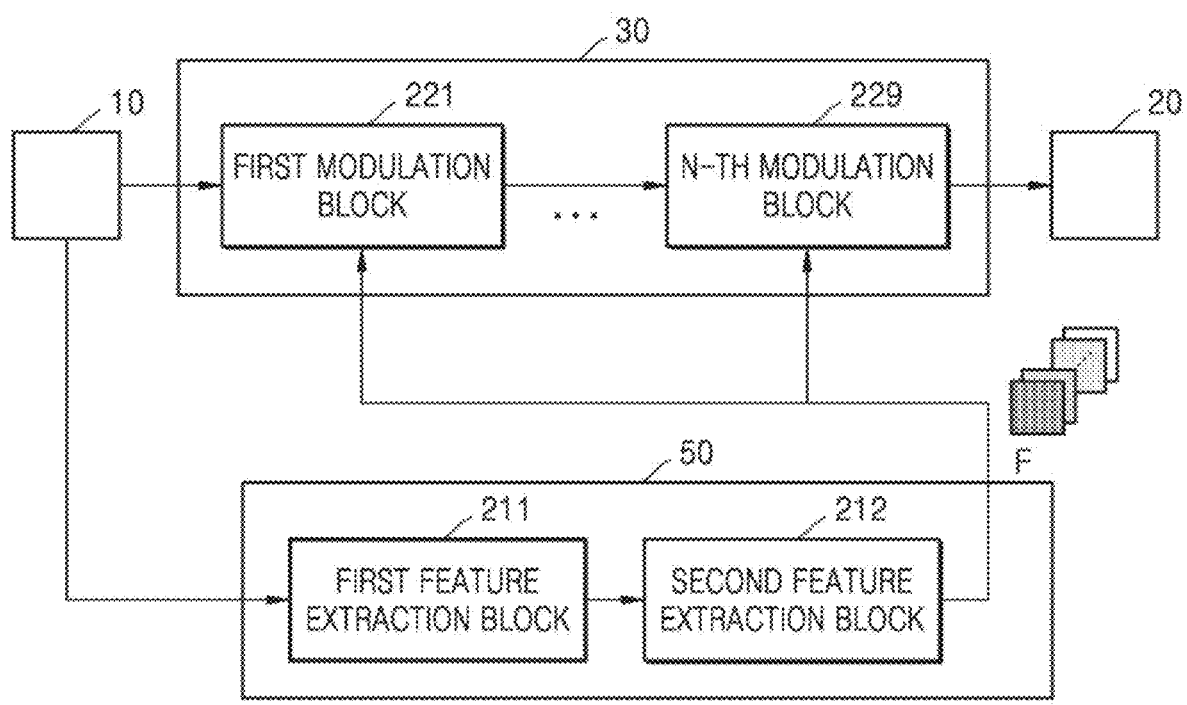
FIG. 2 is a diagram showing structures of an image quality processing network and a feature extraction network, according to an embodiment of the disclosure.

FIG. 2 is a diagram showing structures of the image quality processing network and the feature extraction network, according to an embodiment of the disclosure.

Referring to FIG. 2, the feature extraction network 50 according to an embodiment of the disclosure may include one or more feature extraction blocks. In FIG. 2, for convenience of description, the feature extraction network 50 is shown as including a first feature extraction block 211 and a second feature extraction block 212, but the feature extraction network 50 may include additional feature extraction blocks. In addition, the first feature extraction block 211 and the second feature extraction block 212 may be configured such that a processing output of one feature extraction block is provided as input to another feature extraction block, and thus the feature extraction blocks may be characterized as being serially connected to each other.

In addition, in FIG. 2, the first image (input image) 10 is shown as being input to the first feature extraction block 211, but the operations are not limited thereto. For example, a convolution layer, an activation layer, and the like may be positioned as to receive the input image 10 before the first feature extraction block 211. Thus, an image in which a certain processing operation (e.g., convolution) has been performed on the first image 10 may be provided as input to the first feature extraction block 211. In addition, another feature extraction block, a convolution layer, an activation layer, and the like may be provided between the first feature extraction block 211 and the second feature extraction block 212, between any two feature extraction blocks, or after a final feature extraction block of the feature extraction network.

Hereinafter, a structure and operations of the first feature extraction block 211 according to an embodiment of the disclosure will be described with reference to FIG. 3.

Figure 3:
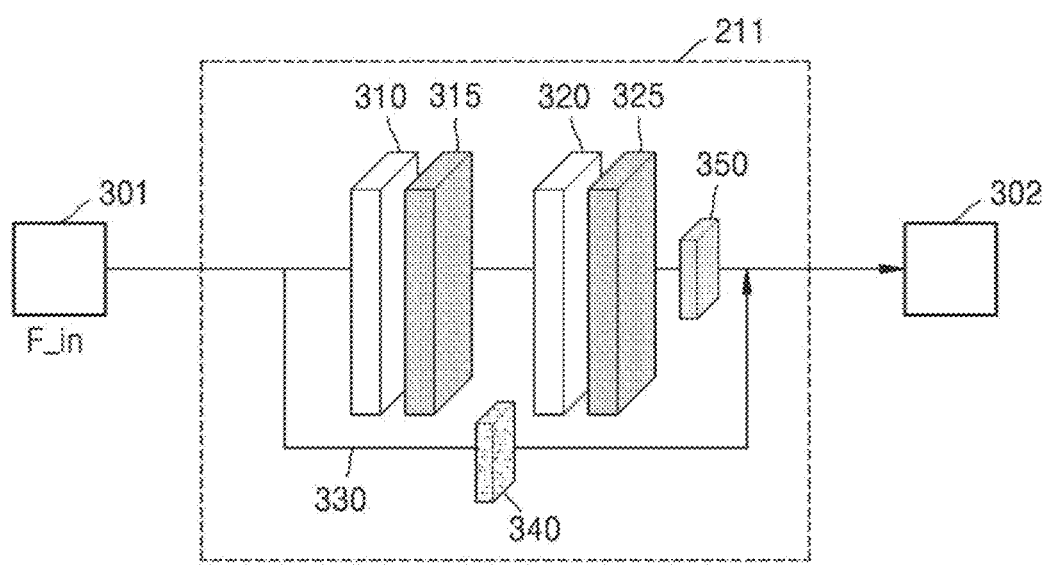
FIG. 3 is a diagram showing a structure of a first feature extraction block, according to an embodiment of the disclosure.

FIG. 3 is a diagram showing a structure of the first feature extraction block 211, according to an embodiment of the disclosure.

Referring to FIG. 3, the first feature extraction block 211 according to an embodiment of the disclosure may include a plurality of convolution layers and may include an activation layer for receiving output of each of the plurality of convolution layers. For example, the first feature extraction block 211 may include a first convolution layer 310 and a second convolution layer 320, and a first activation layer 315 may be provided to receive processing output of the first convolution layer 310 and a second activation layer 325 may be provided to receive processing output of the second convolution layer 320. However, the quantity and arrangement of the plurality of convolution layers and activation layers is not limited thereto. For example, one or more convolution layers and one or more activation layers may be further provided to perform processing operations between the first activation layer 315 and the second convolution layer 320.

In the first convolution layer 310, a first feature map may be generated through a convolution operation between an input image F_in 301 input to the first convolution layer 310 and a first kernel included in the first convolution layer 310. The convolution operation will be described below with reference to FIGS. 4 and 5.

Figure 4:
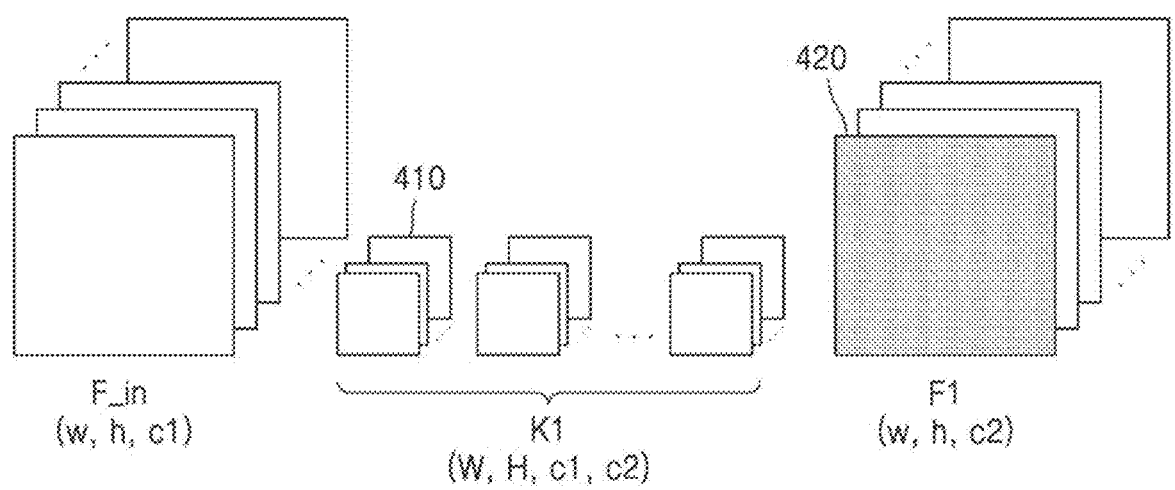
FIG. 4 and FIG. 5 are diagrams describing a convolution operation according to an embodiment of the disclosure.
Figure 5:
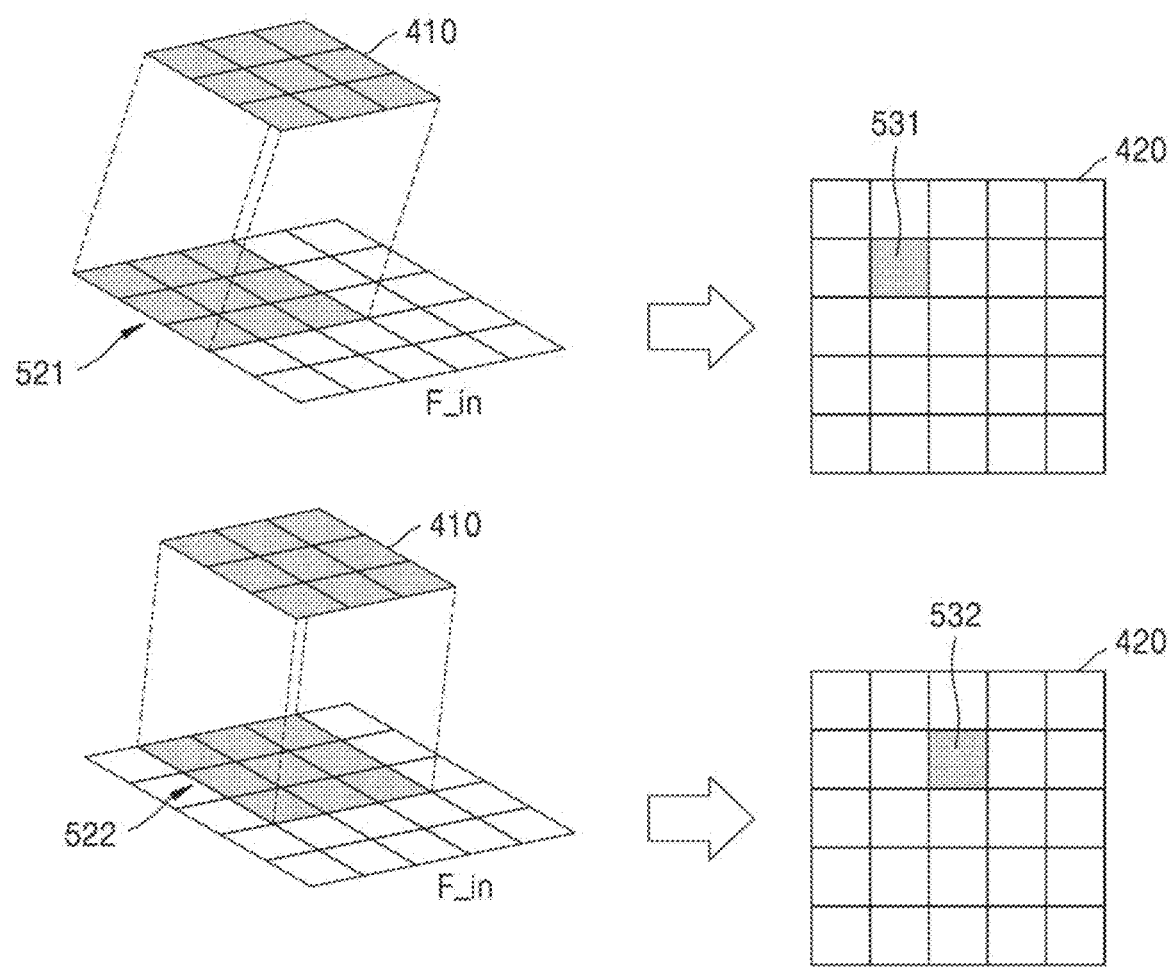

FIGS. 4 and 5 are diagrams describing a convolution operation according to an embodiment of the disclosure.

FIG. 4 is a diagram showing the input image F_in 301 input to the first convolution layer 310, a first kernel K1 included in the first convolution layer 310, and a first feature map F1 output from the first convolution layer 310, according to an embodiment of the disclosure.

Referring to FIG. 4, a size of the input image F_in 301 input to the first convolution layer 310 according to an embodiment of the disclosure may be w×h, and the number of channels may be c1.

In addition, the first convolution layer 310 may include the first kernel K1, and the first kernel K1 may include c2 sub-kernels. In addition, one or more sub-kernels of the c2 sub-kernels may have a size of W×H and may have c1 channels. The number of channels c1 of a sub-kernel may be the same as the number of channels c1 of the input image F_in.

In the first convolution layer 310, the first feature map F1 may be generated by performing a convolution operation between the input image F_in and the first kernel K1. In this regard, a size of the first feature map F1 may be w×h, and the number of channels of the first feature map F1 may be determined by the number of sub-kernels c2 of the first kernel K1.

FIG. 5 is a diagram describing a process of generating a first channel image 420 of the first feature map F1 through a convolution operation between the input image F_in and a first sub-kernel 410 included in the first kernel K1, according to an embodiment of the disclosure.

In FIG. 5, for convenience of description, the input image F_in has a size of 5×5 and the number of channels is 1. In addition, one sub-kernel included in the first kernel K1 applied to the input image F_in has a size of 3×3 and the number of channels is 1.

Referring to FIG. 5, a process of extracting features of the input image F_in by applying the first sub-kernel 410 from the upper left to the lower right of the input image F_in is shown. For example, a convolution operation may be performed by applying the first sub-kernel 410 to pixels included in an upper left 3×3 area 521 of the input image F_in. That is, one pixel value 531 mapped to the upper left 3×3 area 521 may be generated by multiplying pixel values included in the upper left 3×3 area 521 and parameter values included in the first sub-kernel 410 and summing the products.

In addition, one pixel value 532 mapped to a 3×3 area 522 may be generated by multiplying pixel values included in the 3×3 area 522 shifted one pixel to the right from the upper left 3×3 area 521 of the input image F_in and parameter values included in the first sub-kernel 410 and summing the products. In the same way, pixel values included in the first channel image 420 of the first feature map F1 may be generated by multiplying a target of the convolution operation and parameter values included in the first sub-kernel 410 and summing the products while scanning the target of the convolution operation in the input image F_in by one pixel from left to right and from top to bottom. In this regard, data that is the target of the convolution operation may be scanned in one pixel increments, but may be scanned using increments of two or more pixels. The number of pixels to which input data is incremented or shifted during a scanning process is referred to as a stride, and a size of the first feature map F1 to be output may be determined according to a size of the stride. In addition, as shown in FIG. 5, padding may be performed to adjust a size of the first feature map F1 to be the same as a size of the input image F_in. Padding refers to increasing a size of the input image F_in by appending a certain value (e.g., '0') to the edge of the input image F_in to prevent reduction in a size of feature information to be output (output data). When a convolution operation is performed after padding is performed, a size of the first feature map F1 may be the same as a size of the input image F_in. However, the disclosure is not limited thereto.

In FIG. 5, only a result of the convolution operation on the first sub-kernel 410 (the first channel image 420 of the first feature map F1) is shown. However, when a convolution operation is performed on c2 sub-kernels, the first feature map F1 including c2 channel images may be output. That is, the number of channels of the first feature map F1 may be determined according to the number of sub-kernels included in the first kernel K1.

Reverting to FIG. 3, the first feature map F1 may be input to the first activation layer 315. In the first activation layer 315, an activation function operation for applying an activation function to the first feature map F1 may be performed. In the activation function operation, non-linearity is assigned to a feature map generated as a result of a convolution operation, and the activation function may include a sigmoid function, a tan h function, a rectified linear unit (ReLU) function, and a leaky ReLU function. However, the activation function operation is not limited thereto.

In addition, a feature map output from the first activation layer 315 may be input to the second convolution layer 320. In the second convolution layer 320, a second feature map may be generated through a convolution operation between the feature map input to the second convolution layer 320 and a second kernel included in the second convolution layer 320.

The second feature map may be input to the second activation layer 325, and in the second activation layer 325, an activation function operation for applying an activation function to the second feature map may be performed.

In addition, the first feature extraction block 211 may further include a normalization layer 350. For example, when the image quality processing network 30 and the feature extraction network 50 according to an embodiment of the disclosure are trained by the same loss function, a size of the feature extraction network 50 is less than a size of the image quality processing network 30. Thus, gradient exploding occurs in the feature extraction network 50, in which a value of a gradient updated during a training process of a network increases (diverges). As the value of the gradient increases, parameter values (weight values) included in a kernel also increase (diverge), which leads to a decrease in training speed and efficiency.

Accordingly, the normalization layer 350 according to an embodiment of the disclosure may adjust a range of values output from the second activation layer 325 to prevent the occurrence of gradient exploding. For example, the normalization layer 350 may normalize values output from the second activation layer 325 to values from 0 to 255 or to values from −1 to 1. A range subject to normalization may be determined according to hardware performance, etc. of the image processing apparatus 100 according to an embodiment of the disclosure.

In addition, referring to FIG. 3, the first feature extraction block 211 may include a skip connection 330 for skipping a plurality of convolution layers (e.g., the first convolution layer 310 and the second convolution layer 320). The skip connection 330 may have a structure of connecting an input of the first convolution layer 310 to an output of the normalization layer 350. For example, the first feature extraction block 211 may include the skip connection 330 and thus may generate an output image 302 by adding an input image 301 to a result of passing the input image 301 through the first convolution layer 310 and the second convolution layer 320. Accordingly, the first feature extraction block 211 may refer to a network having learned residuals between the input image 301 and the output image 302.

In addition, the first feature extraction block 211 may further include a residual scaler 340 for adjusting sizes of values subject to skip connection. To adjust sizes of values included in the input image 301 without losing feature information of the input image 301, the residual scaler 340 may perform an operation of multiplying each of the values included in the input image 301 by a preset constant value.

Although only the first feature extraction block 211 has been shown and described in FIG. 3, the second feature extraction block 212 may also include the same structure as the first feature extraction block 211 and may perform the same operations as the first feature extraction block 211.

Figure 6:
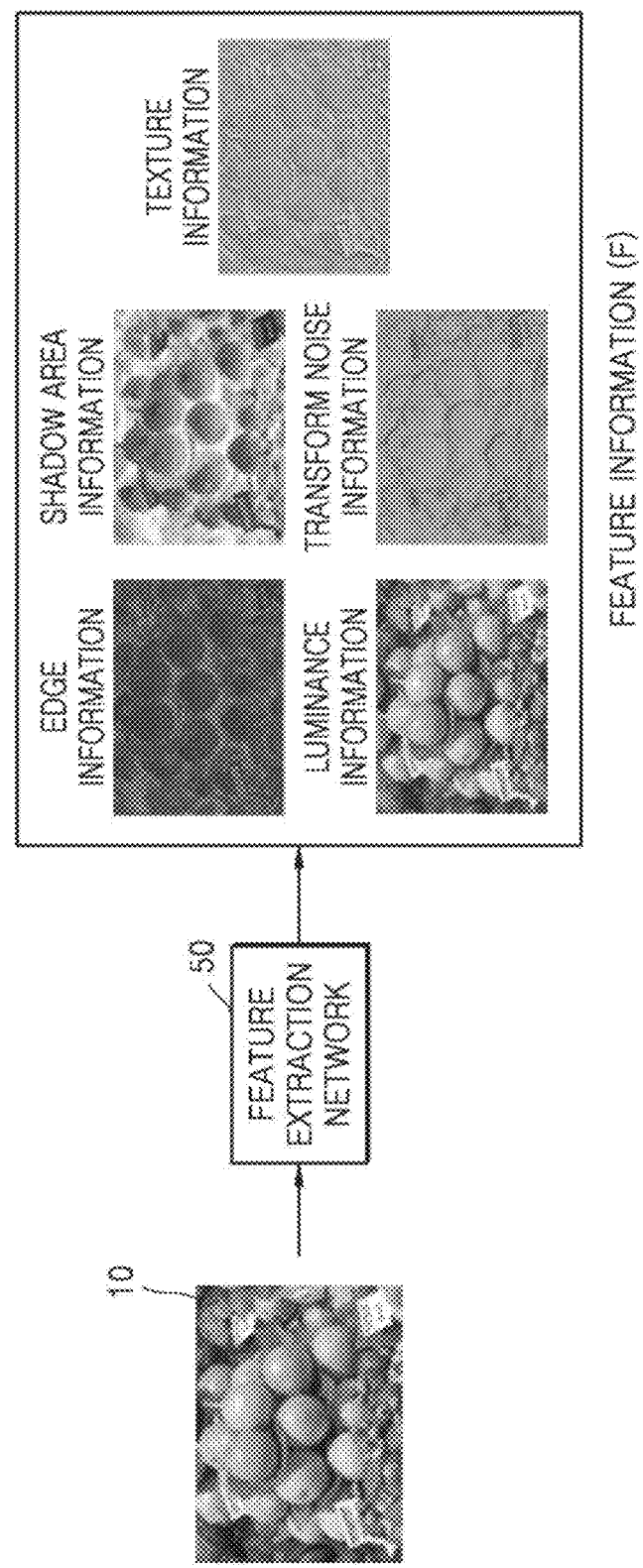
FIG. 6 is a diagram showing feature information extracted by a feature extraction network, according to an embodiment of the disclosure.

FIG. 6 is a diagram showing feature information extracted by the feature extraction network 50, according to an embodiment of the disclosure.

Referring to FIG. 6, the feature extraction network 50 according to an embodiment of the disclosure may extract feature information of the first image 10 by using one or more feature extraction blocks. In this regard, the feature information (F) extracted by the feature extraction network 50 may include at least one of edge information, shadow area information, luminance information, transform noise information, or texture information of the first image 10.

Referring to FIG. 2, feature information F extracted by the feature extraction network 50 may be provided as input to the image quality processing network 30. For example, feature information generated by processing of the first image 10 through the first feature extraction block 211 and the second feature extraction block 212 according to an embodiment of the disclosure may be provided as input to each of first to n-th modulation blocks 221 to 229 included in the image quality processing network 30.

By using feature information of the first image 10 extracted by the feature extraction network 50 in the image quality processing network 30, the image processing apparatus 100 according to an embodiment of the disclosure may improve image quality while maintaining edge information, texture information, etc. of the first image 10.

Referring to FIG. 2, the image quality processing network 30 according to an embodiment of the disclosure may include at least one of the first to n-th modulation blocks 221 to 229. In addition, in FIG. 2, the first image (input image) 10 is shown as being input to the first modulation block 221, but the configuration is not limited thereto. For example, a convolution layer, an activation layer, and the like may be provided to perform processing on the input image 10 before the first modulation block 221, and thus, an image in which one or more image processing operations has been performed on the first image 10 may be provided as input to the first modulation block 221.

Hereinafter, a structure and operations of the first modulation block 221 according to an embodiment of the disclosure will be described with reference to FIG. 7.

Figure 7:
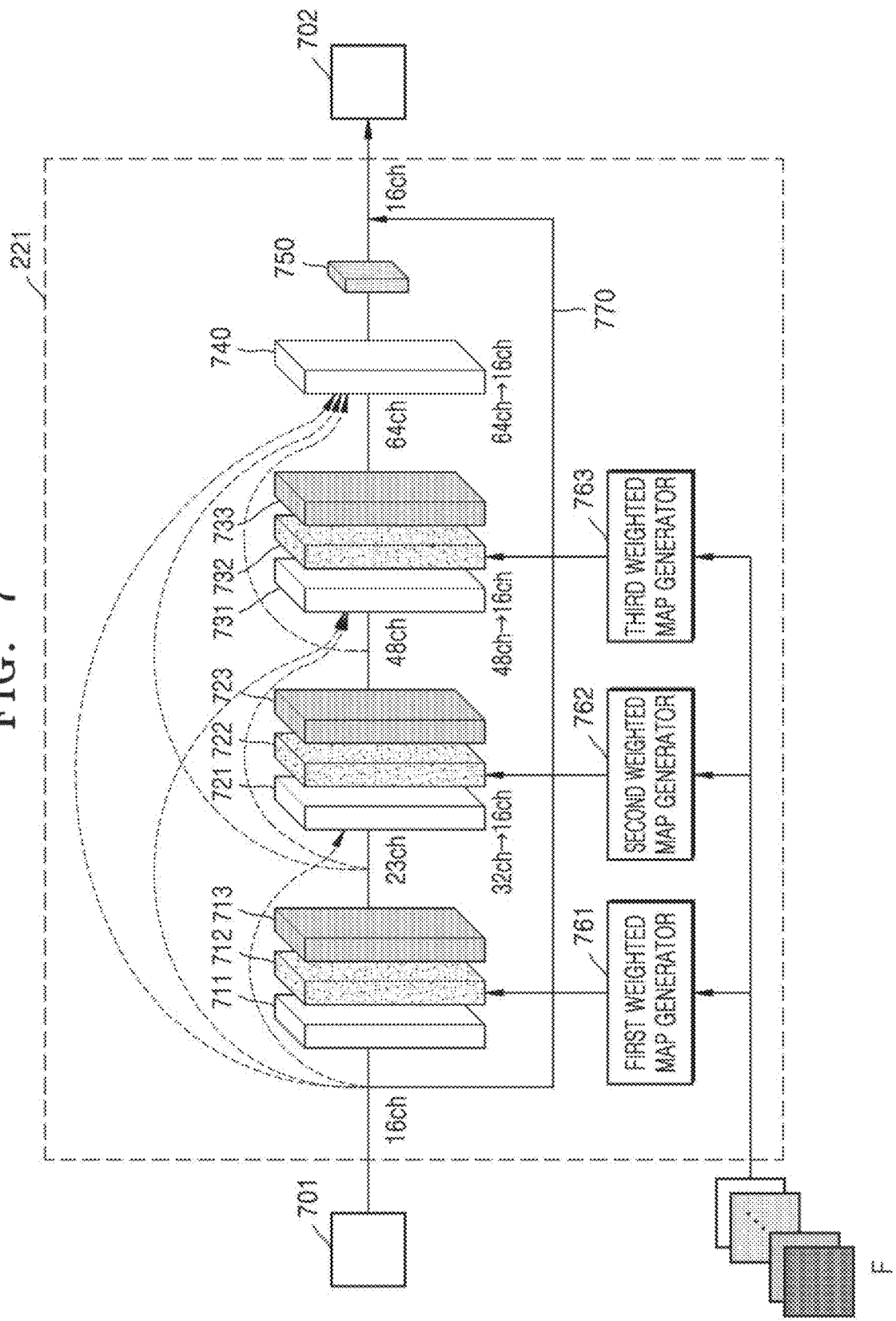
FIG. 7 is a diagram showing a structure of a first modulation block, according to an embodiment of the disclosure.

FIG. 7 is a diagram showing a structure of the first modulation block, according to an embodiment of the disclosure.

Referring to FIG. 7, the first modulation block 221 according to an embodiment of the disclosure may include a plurality of convolution layers and may include a modulation layer provided to receive processing outputs of each of the plurality of convolution layers. In addition, the first modulation block 221 may include an activation layer provided to receive processing output of the modulation layer. For example, a first convolution layer 711, a first modulation layer 712, and a first activation layer 713 may be sequentially arranged such that output from the first convolution layer 711 is serially provided as input to the first modulation layer 712 and output from the first modulation layer 712 is serially provided as input to the first activation layer 713, and a second convolution layer 721, a second modulation layer 722, and a second activation layer 723 may be sequentially arranged such that output from the second convolution layer 721 is serially provided as input to the second modulation layer 722 and output from the second modulation layer 722 is serially provided as input to the second activation layer 723, and a third convolution layer 731, a third modulation layer 732, and a third activation layer 733 may be sequentially arranged such that output from the third convolution layer 731 is serially provided as input to the third modulation layer 732 and output from the third modulation layer 732 is serially provided as input to the third activation layer 733. In addition, an output of the first activation layer 713 may be provided as an input of the second convolution layer 721, and an output of the second activation layer 723 may be provided as an input of the third convolution layer 731. However, the configuration and arrangement of the first modulation block 221 is not limited thereto.

In the first convolution layer 711, a first feature map may be generated through a convolution operation between an input image 701 input to the first convolution layer 711 and a first kernel included in the first convolution layer 711. The convolution operation has been described with reference to FIGS. 4 and 5, and thus, a redundant description thereof is omitted.

The first feature map output from the first convolution layer 711 may be input to the first modulation layer 712.

The first modulation block 221 according to an embodiment of the disclosure may further include a weighted map generator corresponding to each of a plurality of modulation layers.

For example, the first modulation block 221 may include a first weighted map generator 761 corresponding to the first modulation layer 712, a second weighted map generator 762 corresponding to the second modulation layer 722, and a third weighted map generator 763 corresponding to the third modulation layer 732.

Each of the first to third weighted map generators 761 to 763 according to an embodiment of the disclosure may receive the feature information F extracted by the feature extraction network 50 and generate a plurality of weighted maps.

An operation of the weighted map generator will be described in detail with reference to FIG. 8.

Figure 8:
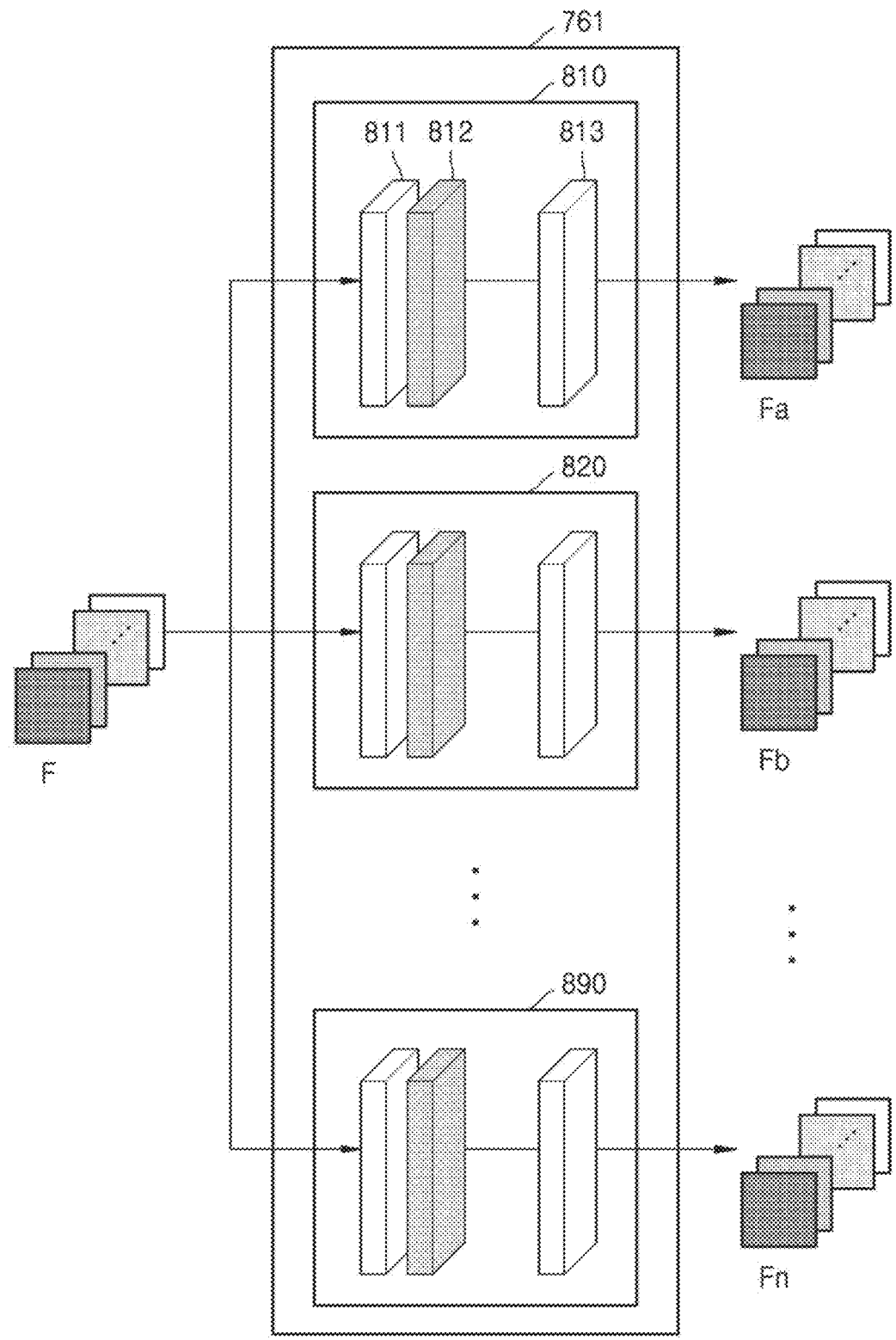
FIG. 8 is a diagram showing a structure of a first weighted map generator, according to an embodiment of the disclosure.

FIG. 8 is a diagram showing a structure of the first weighted map generator 761, according to an embodiment of the disclosure.

Referring to FIG. 8, the first weighted map generator 761 may include one or more weighted map generation blocks, and the weighted map generation blocks may include a convolution layer and an activation layer. For example, the first weighted map generator 761 may include first to n-th weighted map generation blocks 810 to 890, and the first to n-th weighted map generation blocks 810 to 890 may be arranged to perform processing in parallel. In addition, the first weighted map generation block 810 may receive the feature information F extracted by the feature extraction network 50 and generate a first weighted map Fa, the second weighted map generation block 820 may receive the feature information F extracted by the feature extraction network 50 and generate a second weighted map Fb, and the nth weighted map generation block 890 may receive the feature information F extracted by the feature extraction network 50 and generate an nth weighted map Fn.

Referring to FIG. 8, the first weighted map generation block 810 may include a first convolution layer 811, an activation layer 812, and a second convolution layer 813 arranged to receive processing output of the first convolution layer 811 as input and arranged to provide processing output as input to the second convolution layer 813. However, the configuration is not limited thereto. In the first convolution layer 811, a first feature map may be generated through a convolution operation between the feature information F input to the first convolution layer 811 and a first kernel included in the first convolution layer 811. The first feature map may be input to the activation layer 812, and in the activation layer 812, an activation function operation for applying an activation function to the first feature map may be performed. A feature map output from the activation layer 812 may be input to the second convolution layer 813, and in the second convolution layer 813, the first weighted map Fa may be generated through a convolution operation between the feature map input to the second convolution layer 813 and a second kernel included in the second convolution layer 813.

In similar configuration to the first weighted map generation block 810, the second weighted map generation block 820 may be configured to receive the feature information F and generate a second weighted map Fb, and the n-th weighted map generation block 890 may receive the feature information F and generate an n-th weighted map Fn.

The first to n-th weighted maps Fa to Fn generated by the first weighted map generator 761 may be input to the first modulation layer 712 of FIG. 7.

Referring to FIG. 7, in the first modulation layer 712, a plurality of weighted maps (e.g., the first to n-th weighted maps Fa to Fn) received from the first weighted map generator 761 may be applied to the first feature map output from the first convolution layer 711.

An operation of performing modulation by applying the plurality of weighted maps to the first feature map in the first modulation layer 712 will be described in detail with reference to FIGS. 9 and 10.

Figure 9:
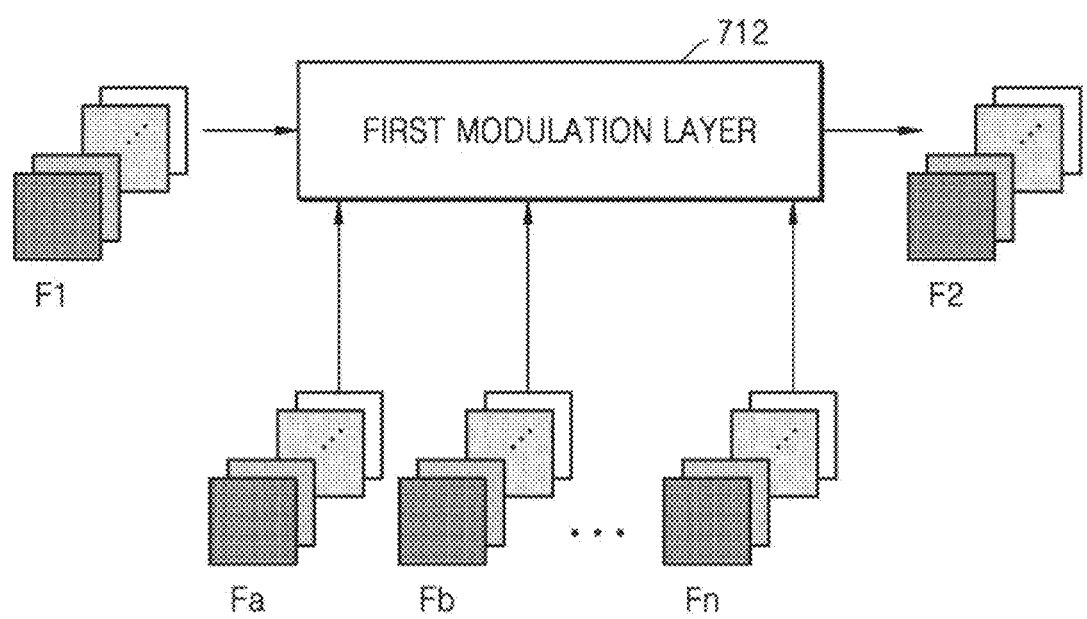
FIG. 9 and FIG. 10 are diagrams referred to for describing an operation of a first modulation layer, according to an embodiment of the disclosure.
Figure 10:
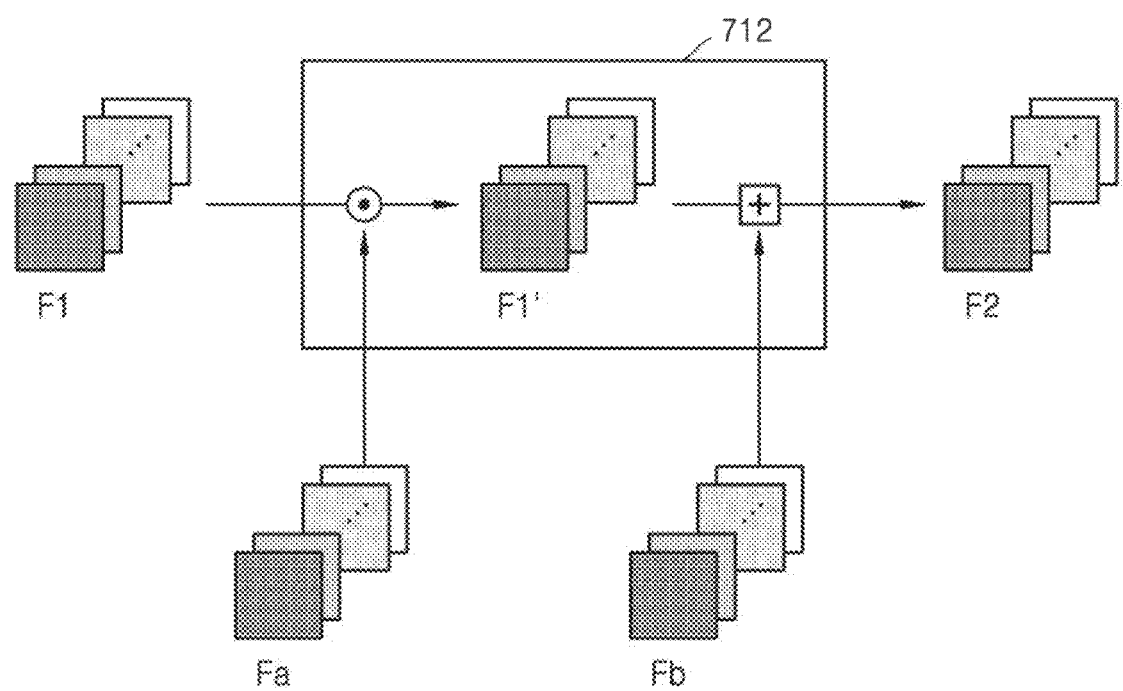

FIGS. 9 and 10 are diagrams referred to for describing an operation of the first modulation layer 712, according to an embodiment of the disclosure.

Referring to FIG. 9, the first modulation layer 712 according to an embodiment of the disclosure may receive the first feature map F1 output from the first convolution layer 711 and the first to n-th weighted maps Fa to Fn output from the first weighted map generator 761. The first modulation layer 712 may generate a second feature map F2 by performing various operations, based on the first feature map F1 and a plurality of weighted maps, for example, the first to n-th weighted maps Fa to Fn.

For example, as shown in FIG. 10, when a plurality of weighted maps output from the first weighted map generator 761 include a first weighted map Fa and a second weighted map Fb, the first modulation layer 712 may generate the second feature map F2 by performing a first operation between the first feature map F1 and the first weighted map Fa and performing a second operation between a value F1' on which the first operation has been performed and the second weighted map Fb.

In this regard, the first operation and the second operation may be an element-wise multiplication operation or an element-wise summation operation. Sizes of the first feature map F1, the first weighted map Fa, and the second weighted map Fb may be the same as one another to perform an element-wise operation. The element-wise operation refers to an operation performed between values in the same position to perform an operation on each of the values included in the first feature map F1 and each of the values included in the weighted map.

For example, in the first modulation layer 712, an element-wise multiplication operation between the first feature map F1 and the first weighted map Fa may be performed, and an element-wise addition operation between the result F1' of performing the element-wise multiplication operation and the second weighted map Fb may be performed. Alternatively, the first operation may be an element-wise summation operation and the second operation may be an element-wise multiplication operation, but the operations of the first modulation layer 712 are not limited thereto.

In the first modulation layer 712 according to an embodiment of the disclosure, various operations may be applied.

For example, the first modulation layer 712 may generate the second feature map F2 by modulating the first feature map F1, based on a plurality of weighted maps, for example, the first to n-th weighted maps Fa to Fn, as shown in one of the following Equations 1 to 3.

$$F2 = Fa \times F1^n + Fb \times F1^{n-1} + \ldots + Fn \quad \text{[Equation 1]}$$

$$F2 = Fa \times \log(F1^n) + Fb \times \log(F1^{n-1}) + \ldots + Fn \quad \text{[Equation 2]}$$

$$F2 = \exp(Fa \times F1) + \exp(Fb \times F1) + \ldots + \exp(Fn \times F1) \quad \text{[Equation 3]}$$

Referring to FIG. 7, a second feature map output from the first modulation layer 712 may be input to the first activation layer 713, and in the first activation layer 713, an activation function operation for applying an activation function to the second feature map may be performed.

In addition, a feature map output from the first activation layer 713 may be input to the second convolution layer 721.

In addition, the input image 701 may be input to the second convolution layer 721. In this regard, the feature map output from the first activation layer 713 and the input image 701 may be concatenated and input to the second convolution layer 721. For example, when the feature map output from the first activation layer 713 has 16 channels, and the input image 701 has 16 channels, 32 channels may be input to the second convolution layer 721.

In the second convolution layer 721, a third feature map may be generated through a convolution operation between the feature map input to the second convolution layer 721 and a second kernel included in the second convolution layer 721. In this regard, as described with reference to FIGS. 4 and 5, the number of channels of a third feature map to be output may be adjusted by adjusting the number of sub-kernels included in the second kernel. For example, a third feature map including 16 channels may be generated by performing a convolution operation between the feature map (including 32 channels) input to the second convolution layer 721 and the second kernel with the number of sub-kernels included in the second kernel as 16.

In addition, the third feature map may be input to the second modulation layer 722, and a plurality of weighted maps generated by the second weighted map generator 762 may be input to the second modulation layer 722. The second weighted map generator 762 may generate a plurality of weighted maps in the same way as the first weighted map generator 761 described with reference to FIG. 8.

In the second modulation layer 722, a fourth feature map may be generated by performing modulation by applying the plurality of weighted maps to the third feature map.

The second modulation layer 722 may generate a fourth feature map by modulating the third feature map in the same way as the first modulation layer 712 described with reference to FIGS. 9 and 10.

The fourth feature map may be input to the second activation layer 723, and in the second activation layer 723, an activation function operation for applying an activation function to the fourth feature map may be performed.

In addition, a feature map output from the second activation layer 723 may be input to the third convolution layer 731. In addition, the input image 701 and the feature map output from the first activation layer 713 may also be input to the third convolution layer 731. In this regard, the feature map output from the second activation layer 723, the input image 701, and the feature map output from the first activation layer 713 may be concatenated and input to the third convolution layer 731. For example, when the feature map output from the second activation layer 723 has 16 channels, the input image 701 has 16 channels, and the feature map output from the first activation layer 713 has 16 channels, 48 channels may be input to the third convolution layer 731.

In the third convolution layer 731, a fifth feature map may be generated through a convolution operation between the feature map input to the third convolution layer 731 and a third kernel included in the third convolution layer 731. In this regard, the number of channels of a fifth feature map to be output may be adjusted by adjusting the number of sub-kernels included in the third kernel. For example, a fifth feature map including 16 channels may be generated by performing a convolution operation between the feature map (including 48 channels) input to the third convolution layer 731 and the third kernel with the number of sub-kernels included in the third kernel as 16.

The fifth feature map may be input to the third modulation layer 732, and a plurality of weighted maps generated by the third weighted map generator 763 may be input to the third modulation layer 732. The third weighted map generator 763 may generate a plurality of weighted maps in the same way as the first weighted map generator 761 described with reference to FIG. 8.

In the third modulation layer 732, a sixth feature map may be generated by performing modulation by applying the plurality of weighted maps to the fifth feature map.

The third modulation layer 732 may generate a sixth feature map by modulating the fifth feature map in the same way as the first modulation layer 712 described with reference to FIGS. 9 and 10.

The sixth feature map may be input to the third activation layer 733, and in the third activation layer 733, an activation function operation for applying an activation function to the sixth feature map may be performed.

In addition, a feature map output from the third activation layer 733 may be input to a fourth convolution layer 740. In addition, the input image 701, the feature map output from the first activation layer 713, and the feature map output from the second activation layer 723 may also be input to the fourth convolution layer 740. In this regard, the feature map output from the third activation layer 733, the input image 701, the feature map output from the first activation layer 713, and the feature map output from the second activation layer 723 may be concatenated and input to the fourth convolution layer 740.

For example, when the feature map output from the third activation layer 733 has 16 channels, and each of the input image 701, the feature map output from the first activation layer 713, and the feature map output from the second activation layer 723 has 16 channels, 64 channels may be input to the fourth convolution layer 740.

In the fourth convolution layer 740, a seventh feature map may be generated through a convolution operation between the feature map input to the fourth convolution layer 740 and a fourth kernel included in the fourth convolution layer 740. In this regard, the number of channels of a seventh feature map to be output may be adjusted by adjusting the number of sub-kernels included in the fourth kernel. For example, a seventh feature map including 16 channels may be generated by performing a convolution operation between the feature map (including 64 channels) input to the fourth convolution layer 740 and the fourth kernel with the number of sub-kernels included in the fourth kernel as 16.

In addition, the first modulation block 221 may further include a feature scaler 750 for adjusting sizes of values included in the seventh feature map. To adjust sizes of values included in the seventh feature map while maintaining feature information of the seventh feature map, the feature scaler 750 may perform an operation of multiplying each of the values included in the seventh feature map by a preset constant value.

In addition, the first modulation block 221 may include a skip connection 770 for skipping a plurality of convolution layers. The skip connection 770 may be provided for connecting an input (e.g., the input image 701) of the first convolution layer 711 to an output of the feature scaler 750. For example, the first modulation block 221 may include the skip connection 770 and thus may generate an output image 702 by adding the input image 701 to the feature map output as a result of passing the input image 701 through the first to fourth convolution layers 711, 721, 731, and 740. Accordingly, the first modulation block 221 may refer to a network having learned residuals between the input image 701 and the output image 702.

In addition, the first modulation block 221 may efficiently restore edge information, etc. included in the input image 701 with a small number of layers by using channel concatenation and skip connection.

Although only the first modulation block 221 has been shown and described in FIG. 7, other modulation blocks (e.g., second to n-th modulation blocks) included in the image quality processing network 30 may also include structures the same as the structure of the first modulation block 221 and may perform operations the same as operations of the first modulation block 221.

At least one of the first and second feature extraction blocks 211 and 212 shown and described in FIGS. 2 and 3 or the first to n-th modulation blocks 221 to 229 shown and described in FIGS. 2 and 7 to 10 may be implemented in a form of a hardware chip designed, configured, or programmed to perform the above-described operations, and provided in an image processing apparatus according to an embodiment of the disclosure. For example, at least one of the feature extraction blocks or the modulation blocks may be manufactured in a form of a dedicated hardware chip for artificial intelligence (AI), or may be manufactured as a part of an existing general-purpose processor (e.g., a central processing unit (CPU) or an application processor) or a graphics-dedicated processor (e.g., a graphics processing unit (GPU)) and provided in the image processing apparatus 100 according to an embodiment of the disclosure.

In addition, at least one of the feature extraction blocks or the modulation blocks may be implemented as a software module. When at least one of the feature extraction blocks or the modulation blocks is implemented as a software module (or a program module including an instruction), the software module may be stored in a non-transitory computer-readable recording medium. In addition, in this case, at least one software module may be executed under control of an operating system (OS) or a certain image processing application. Alternatively, some of at least one software module may be implemented by an OS, and the others may be implemented by a certain image processing application.

The block diagrams of the first feature extraction block 211 described with reference to FIG. 3 and the first modulation block 221 described with reference to FIG. 7 are those for an embodiment of the disclosure. In the block diagrams, elements may be integrated, another element may be added, or an element may be omitted, based on a specification of the image processing apparatus 100 including a feature extraction block and a modulation block actually implemented. In other words, two or more elements may be integrated as one element or one element may be divided into two or more elements when necessary. In addition, a function performed by each block is for describing embodiments of the disclosure, and a detailed operation or apparatus thereof does not limit the scope of the disclosure.

Figure 11:
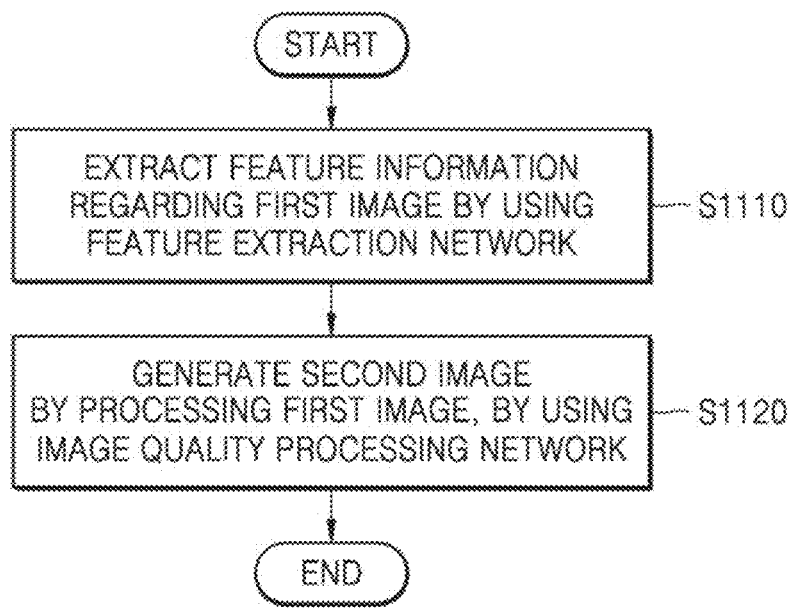
FIG. 11 and FIG. 12 are flowcharts showing a method of operating an image processing apparatus, according to an embodiment of the disclosure.
Figure 12:
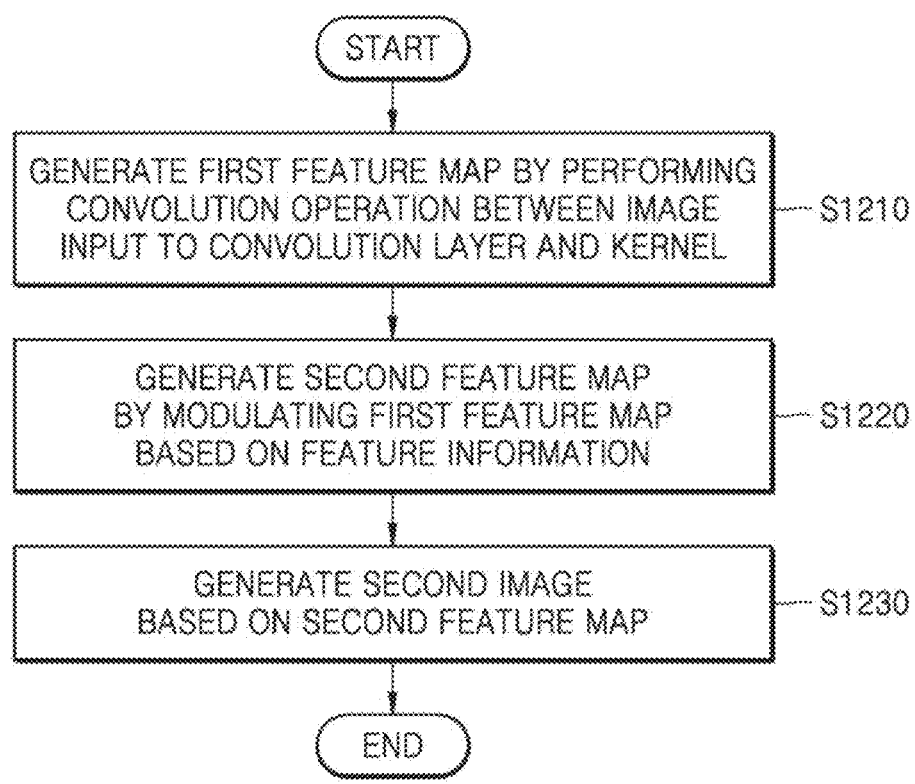

FIG. 11 is a flowchart showing a method of operating an image processing apparatus, according to an embodiment of the disclosure, and FIG. 12 is a flowchart showing operations included in operation S1120 of FIG. 11.

Referring to FIG. 11, the image processing apparatus 100 according to an embodiment of the disclosure may extract feature information regarding a first image by using a feature extraction network (operation S1110). For example, the feature extraction network may include one or more feature extraction blocks, and one feature extraction block may include a plurality of convolution layers and an activation layer for performing processing on outputs of each of the plurality of convolution layers.

In addition, the feature extraction block may include a skip connection for skipping one or more convolution layers. In addition, the feature extraction block may further include a normalization layer and a residual scaler.

The image processing apparatus 100 may extract feature information by performing a convolution operation, an activation operation, normalization, and the like on the first image, as described in detail with reference to FIG. 3.

Feature information according to an embodiment of the disclosure may include at least one of edge information, shadow area information, luminance information, transform noise information, or texture information of the first image.

The image processing apparatus 100 according to an embodiment of the disclosure may generate a second image by processing the first image, by using an image quality processing network (operation S1120). In this regard, the feature information extracted by the feature extraction network may be input to the image quality processing network, and the image processing apparatus 100 may process the first image, based on the feature information.

Operation S1120 will be described in detail with reference to FIG. 12.

FIG. 12 is a detailed flowchart of operation S1120 of FIG. 11.

An image quality processing network according to an embodiment of the disclosure may include a plurality of modulation blocks, and one modulation block may include a plurality of convolution layers and a modulation layer for performing processing on outputs of each of the plurality of convolution layers. In addition, a modulation block according to an embodiment of the disclosure may include an activation layer for performing processing on output of the modulation layer. In addition, a modulation block according to an embodiment of the disclosure may include a weighted map generator corresponding to the modulation layer. A structure of the modulation block has been described in detail with reference to FIG. 7, and thus, a redundant description thereof is omitted.

Referring to FIG. 12, the image processing apparatus 100 according to an embodiment of the disclosure may generate a first feature map by performing, in a convolution layer, a convolution operation between an image input to the convolution layer and a kernel (operation S1210). The convolution operation has been described with reference to FIGS. 4 and 5, and thus, a redundant description thereof is omitted.

The first feature map output from the convolution layer may be provided as input to a modulation layer.

The image processing apparatus 100 according to an embodiment of the disclosure may generate a second feature map by modulating the first feature map input to the modulation layer, based on feature information extracted in operation S1110 of FIG. 11 (operation S1220).

For example, the image processing apparatus 100 may generate one or more weighted maps, based on feature information extracted by a feature extraction network. The image processing apparatus 100 may generate one or more weighted maps by applying a convolution operation, an activation function operation, and the like on the feature information.

The image processing apparatus 100 may generate a second feature map by performing modulation by applying a plurality of weighted maps to the first feature map input to the modulation layer. For example, when the plurality of weighted maps include a first weighted map and a second weighted map, the image processing apparatus 100 may generate a second feature map by performing a first operation between the first feature map and the first weighted map and performing a second operation between a value on which the first operation has been performed and the second weighted map. In this regard, the first operation and the second operation may be an element-wise multiplication operation or an element-wise summation operation. However, the configuration is not limited thereto, and a second feature map may be generated by performing various operations.

The image processing apparatus 100 according to an embodiment of the disclosure may generate a second image, based on the second feature map (operation S1230).

For example, as described with reference to FIG. 7, the image processing apparatus 100 may perform an activation function operation on the second feature map. In addition, while sequentially passing through one or more convolution layers, modulation layers, and activation layers, a feature map on which the activation function operation has been performed may have a convolution operation, modulation, an activation function operation, and the like additionally performed. Accordingly, a second image on which image quality processing has been performed may be generated.

Figure 13:
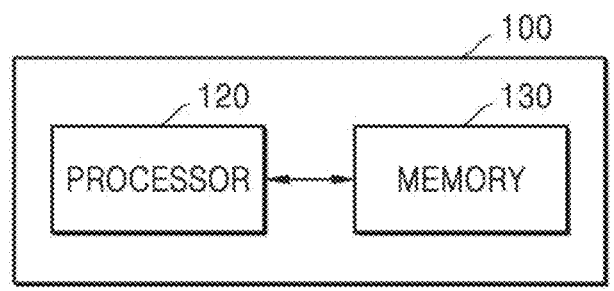
FIG. 13 is a block diagram of an image processing apparatus, according to an embodiment of the disclosure.

FIG. 13 is a block diagram of the image processing apparatus 100, according to an embodiment of the disclosure.

Referring to FIG. 13, the image processing apparatus 100 according to an embodiment of the disclosure may include a processor 120 and a memory 130.

The processor 120 according to an embodiment of the disclosure may generally control operations of the image processing apparatus 100. The processor 120 according to an embodiment of the disclosure may execute one or more programs stored in the memory 130.

The memory 130 according to an embodiment of the disclosure may store various pieces of data, programs, or applications for driving and controlling the image processing apparatus 100. The memory 130 may include any combination of memory including read-only memory (ROM), random access memory (RAM), flash memory, optical memory, and any other type of memory for storing data and programs to be retrieved and loaded for execution by the processor 120. A program stored in the memory 130 may include one or more instructions. A program (one or more instructions) or an application stored in the memory 130 may be executed by the processor 120.

The processor 120 according to an embodiment of the disclosure may include at least one of a CPU, a GPU, or a video processing unit (VPU). Alternatively, in some embodiments of the disclosure, the processor 120 may be implemented in a form of a system on a chip (SoC) having at least one of a CPU, a GPU, or a VPU integrated. Alternatively, the processor 120 may further include a neural processing unit (NPU).

The processor 120 according to an embodiment of the disclosure may remove compression artifacts included in an input image by using the feature extraction network 50 and the image quality processing network 30. In addition, processing for removing noise may be performed while maintaining detailed texture information and structure information, such as the edge, of the input image.

For example, the processor 120 may extract feature information of a first image by using the feature extraction network 50 shown and described in FIGS. 2 to 6. In addition, the processor 120 may generate a second image by performing image quality processing on the first image, by using the image quality processing network 30 shown and described in FIGS. 2 and 7 to 10.

For example, the processor 120 may extract feature information by performing a convolution operation, an activation operation, normalization, and the like on the first image, by using the feature extraction network 50. Feature information according to an embodiment of the disclosure may include at least one of edge information, shadow area information, luminance information, transform noise information, or texture information of the first image.

In addition, the processor 120 may generate a second image by performing a convolution operation, a modulation operation, an activation operation, and the like on the first image, by using the image quality processing network 30. In this regard, the modulation operation refers to application of feature information extracted by a feature extraction network to a first feature map generated as a result of the convolution operation. For example, the processor 120 may generate a plurality of weighted maps, based on the feature information, and may generate a second feature map by performing a processing operation between the plurality of weighted maps and the first feature map. The processor 120 may generate a second image by performing a certain operation on the second feature map.

The feature extraction network 50 and the image quality processing network 30 according to an embodiment of the disclosure may be networks trained by a server or an external device. The external device may train the feature extraction network 50 and the image quality processing network 30, based on training data. In addition, the feature extraction network 50 and the image quality processing network 30 may be commonly trained by using the same loss function.

In this regard, the training data may include a plurality of data sets including image data in which edge characteristics or texture characteristics are preserved while image data including noise and noise are removed.

The server or the external device may determine parameter values included in kernels used in each of a plurality of convolution layers included in the feature extraction network 50 and the image quality processing network 30. For example, the server or the external device may determine parameter values in a direction that minimizes a difference (loss information) in image data in which edge characteristics or texture characteristics are preserved while image data generated by the feature extraction network 50 and the image quality processing network 30 and noise as training data are removed.

The image processing apparatus 100 according to an embodiment of the disclosure may receive, from the server or the external device, the feature extraction network 50 and the image quality processing network 30 having been trained and store the same in the memory 130. For example, the memory 130 may store structures and parameter values of the feature extraction network 50 and the image quality processing network 30 according to an embodiment of the disclosure, and the processor 120 may generate a second image in which edge characteristics or texture characteristics are preserved while noise is removed from a first image according to an embodiment of the disclosure, by using the parameter values stored in the memory 130.

Figure 14:
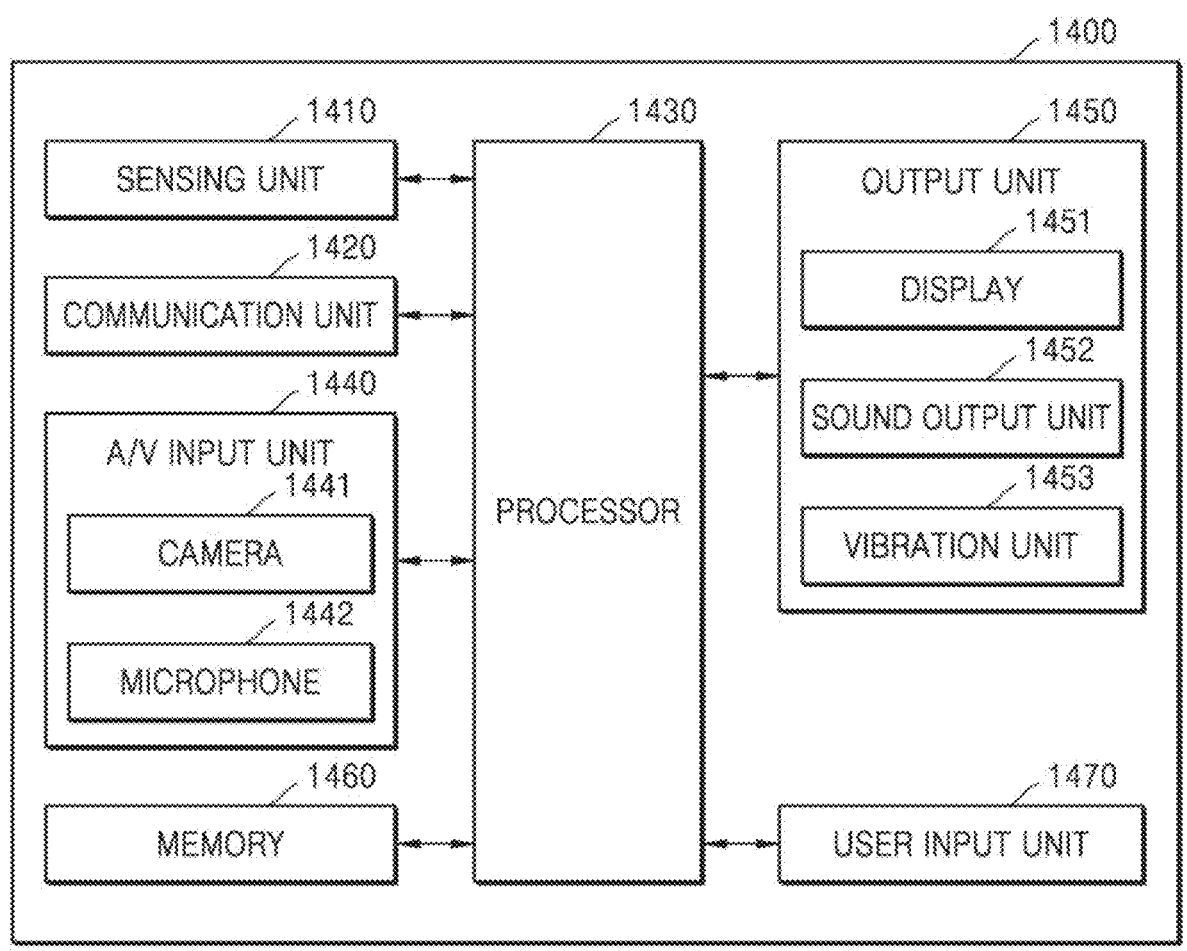
FIG. 14 is a block diagram of an image processing apparatus, according to an embodiment of the disclosure.

FIG. 14 is a block diagram of an image processing apparatus 1400, according to an embodiment of the disclosure. The image processing apparatus 1400 of FIG. 14 may be an embodiment of the image processing apparatus 100 of FIG. 1 or FIG. 13.

Referring to FIG. 14, the image processing apparatus 1400 according to an embodiment of the disclosure may include a sensing unit 1410, a communication unit 1420, a processor 1430, an audio/video (AN) input unit 1440, an output unit 1450, a memory 1460, and a user input unit 1470.

The processor 1430 of FIG. 14 corresponds to the processor 120 of FIG. 13, and the memory 1460 of FIG. 14 corresponds to the memory 130 of FIG. 13, and a redundant description thereof is omitted.

The sensing unit 1410 may include a sensor for sensing a state of the image processing apparatus 1400 or a state of an environment around the image processing apparatus 1400. In addition, the sensing unit 1410 may transmit information sensed by the sensor to the processor 1430.

The communication unit 1420 may include an antenna, circuitry, and software to perform as a short-range wireless communication unit and a mobile communication unit to correspond to the performance and structure of the image processing apparatus 1400, but the communication unit 1420 is not limited thereto.

The short-range wireless communication unit may include, but is not limited to, a Bluetooth communication unit, a Bluetooth low energy (BLE) communication unit, a Near Field Communication unit, a WLAN (Wi-Fi 802.x) communication unit, a ZigBee communication unit, an Infrared Data Association (IrDA) communication unit, a Wi-Fi Direct (WFD) communication unit, an ultra wideband (UWB) communication unit, an Ant+ communication unit, a microwave (uWave) communication unit, etc.

The mobile communication unit transmits and receives wireless signals to and from at least one of a base station, an external terminal, or a server over a mobile communication network (4G, 5G, LTE, etc.). In this regard, the wireless signals may include audio call signals, video call signals, or various formats of data according to the transmission and reception of text/multimedia messages.

The communication unit 1420 according to an embodiment of the disclosure may receive a compressed image from an external device or may transmit a compressed image.

The processor 1430 according to an embodiment of the disclosure may decompress the received compressed image and may perform image quality processing on a decompressed image by using the feature extraction network 50 and the image quality processing network 30 according to an embodiment of the disclosure.

The processor 1430 according to an embodiment of the disclosure may include a single core, a dual core, a triple core, a quad core, and multiples thereof. In addition, the processor 1430 may include a plurality of processors.

The memory 1460 according to an embodiment of the disclosure may include at least one type of storage medium from among a flash memory type, a hard disk type, a multimedia card micro type, a card type memory (e.g., secure digital (SD) or extreme digital (XD) memory), random access memory (RAM), static random access memory (SRAM), read-only memory (ROM), electrically erasable programmable read-only memory (EEPROM), programmable read-only memory (PROM), a magnetic memory, a magnetic disk, and an optical disk.

The A/V input unit 1440 is for inputting an audio signal or a video signal and may include a camera 1441 and a microphone 1442. The camera 1441 may obtain an image frame such as a still image or a video through an image sensor in a video call mode or a shooting mode. An image captured through the image sensor may be processed through the processor 1430 or a separate image processor.

An image frame processed by the camera 1441 may be stored in the memory 1460 or transmitted to the outside through the communication unit 1420. Two or more cameras 1441 may be provided according to a configuration of the image processing apparatus 1400.

The microphone 1442 receives an external sound signal and processes the external sound signal into electrical data. For example, the microphone 1442 may receive a sound signal from an external device or a narrator. The microphone 1442 may use various noise cancelling algorithms for cancelling noise generated during a process of receiving an external sound signal. Speech data may be generated from the electrical signals obtained by the microphone 1442 by, for example, speech-to-text conversion.

The output unit 1450 is for outputting an audio signal, a video signal, or a vibration signal, and may include a display 1451, a sound output unit 1452, and a vibration unit 1453.

The display 1451 according to an embodiment of the disclosure may display an image on which image quality processing has been performed by using the feature extraction network 50 and the image quality processing network 30.

The sound output unit 1452 outputs audio data received from the communication unit 1420 or stored in the memory 1460. In addition, the sound output unit 1452 outputs sound signals related to functions (e.g., a call signal reception sound, a message reception sound, and a notification sound) performed by the image processing apparatus 1400. The sound output unit 1452 may include a speaker, a buzzer, and the like.

The vibration unit 1453 may output a vibration signal. For example, the vibration unit 1453 may output a vibration signal corresponding to an output of audio data or video data (e.g., a call signal reception sound, a message reception sound, etc.). In addition, the vibration unit 1453 may output a vibration signal when a touch is input to a touch screen.

The user input unit 1470 refers to a unit via which a user inputs data for controlling the image processing apparatus 1400. For example, the user input unit 1470 may include, but is not limited to, a key pad, a dome switch, a touch pad (a touch capacitive type, a pressure resistive type, an infrared beam sensing type, a surface acoustic wave type, an integral strain gauge type, a piezo effect type, etc.), a jog wheel, a jog switch, etc.

The block diagrams shown in FIGS. 13 and 14 are those for an embodiment of the disclosure. In the block diagrams, elements may be integrated, another element may be added, or an element may be omitted, based on a specification of the image processing apparatus 100 actually implemented. In other words, two or more elements may be integrated as one element or one element may be divided into two or more elements when necessary. In addition, a function performed by each block is for describing embodiments of the disclosure, and a detailed operation or apparatus thereof does not limit the scope of the disclosure.

A method of operating an image processing apparatus, according to an embodiment of the disclosure, may be implemented in a form of program commands executable through various computer means and be recorded on a non-transitory computer-readable recording medium. The non-transitory computer-readable recording medium may include program commands, data files, and data structures separately or in combinations. The program commands to be recorded on the non-transitory computer-readable recording medium may be specially designed and configured for the disclosure or may be known and available to one of ordinary skill in the art of computer software. Examples of the non-transitory computer-readable recording medium include hardware apparatuses specially configured to store and execute program commands, such as magnetic media such as hard disks, floppy disks, and magnetic tapes, optical media such as compact disc read-only memories (CD-ROMs) and digital versatile discs (DVDs), magneto-optical media such as floptical disks, and ROMs, RAMs, and flash memories. Examples of the program commands include not only machine language codes such as those generated by a compiler but also high-level language codes executable by a computer by using an interpreter.

In addition, an image processing apparatus and a method of operating an image processing apparatus, according to embodiments of the disclosure, may be included in a computer program product and be provided. The computer program product may be traded between a seller and a buyer as a product.

The computer program product may include a software (S/W) program or a non-transitory computer-readable storage medium in which an S/W program is stored. For example, the computer program product may include a product (e.g., a downloadable application) in a form of an S/W program distributed electronically through a manufacturer of an electronic apparatus or an electronic market (e.g., Google™ Play Store or App Store). For electronic distribution, at least a part of the S/W program may be stored in a storage medium or temporarily generated. In this case, the storage medium may be a server of a manufacturer, a server of an electronic market, or a storage medium of a relay server that temporarily stores an S/W program.

The computer program product may include a storage medium of a server or a storage medium of a client device in a system including the server and the client device. Alternatively, when there is a third device (e.g., a smartphone) communicably connected to the server or the client device, the computer program product may include a storage medium of the third device. Alternatively, the computer program product may include the S/W program itself transmitted from the server to the client device or to the third device, or transmitted from the third device to the client device.

In this case, one of the server, the client device, and the third device may execute the computer program product to perform the method according to embodiments of the disclosure. Alternatively, two or more of the server, the client device, and the third device may execute the computer program product to distribute and perform the method according to embodiments of the disclosure.

For example, the server (e.g., a cloud server or an AI server) may execute the computer program product stored on the server to control the client device communicably connected to the server to perform the method according to embodiments of the disclosure.

While embodiments of the disclosure have been particularly described, the scope of the disclosure is not limited thereto, and it will be understood by one of ordinary skill in the art that various changes and modifications using the embodiments of the disclosure defined by the following claims are also within the scope of the disclosure.

An image processing apparatus according to an embodiment of the disclosure may improve image quality of an image while preserving or emphasizing characteristics of the image, by extracting feature information of the image and performing image processing using the extracted feature information.

Accordingly, an image processing apparatus according to an embodiment of the disclosure may perform detailed edge processing and image quality processing for maintaining texture, while removing noise of an input image, by using a neural network, and even when the number of layers of an image quality processing network is reduced, image quality processing performance does not deteriorate.

What is claimed is:

1. An image processing apparatus comprising:
a memory storing one or more instructions; and
a processor configured to execute the one or more instructions stored in the memory to:
extract feature information of an input image by using a feature extraction network; and
generate an output image by processing the input image, by using an image quality processing network comprising one or more modulation blocks, wherein each modulation block among the one or more modulation blocks comprises:
a convolution layer configured to perform a convolution operation between an input to the convolution layer and a kernel in the convolution layer and output a feature map based on the convolution operation,
a modulation layer arranged to receive the feature map output from the convolution layer as input and generate a modulated feature map by modulating the feature map based on the feature information of the input image; and
an activation layer arranged to receive the modulated feature map and generate an output by applying an activation function to the modulated feature map.

2. The image processing apparatus of claim 1, wherein the feature information extracted by the feature extraction network comprises at least one of edge information of the input image, shadow area information of the input image, luminance information of the input image, transform noise information of the input image, or texture information of the input image.

3. The image processing apparatus of claim 1, wherein each modulation block among the one or more modulation blocks further comprises a weighted map generator corresponding to the modulation layer,
wherein the weighted map generator is configured to generate one or more weighted maps, based on the feature information of the input image, and
wherein the processor is further configured to execute the one or more instructions to, in the modulation layer, generate the modulated feature map by applying the one or more weighted maps to the feature map.

4. The image processing apparatus of claim 3, wherein the weighted map generator is further configured to generate the one or more weighted maps by performing a convolution operation and an activation function operation on the feature information of the input image.

5. The image processing apparatus of claim 3, wherein the one or more weighted maps comprises a first weighted map and a second weighted map, and
wherein the processor is further configured to execute the one or more instructions to, in the modulation layer, generate the modulated feature map by performing a first operation between the feature map and the first weighted map and performing a second operation between a result of the first operation and the second weighted map.

6. The image processing apparatus of claim 5, wherein the first operation is a multiplication operation and the second operation is an addition operation.

7. The image processing apparatus of claim 1, wherein the convolution layer comprises a plurality of convolution layers, and
wherein each modulation block among the one or more modulation blocks comprises a skip connection configured to skip image processing of the input by one or more convolution layers among the plurality of convolution layers.

8. The image processing apparatus of claim 1, wherein the convolution layer comprises a plurality of convolution layers arranged to serially provide output as input to a next convolution layer among the plurality of convolution layers, and
wherein each modulation block among the one or more modulation blocks comprises a skip connection configured to skip one or more convolution layers from among the plurality of convolution layers.

9. The image processing apparatus of claim 8, wherein the feature extraction network comprises one or more extraction blocks, each extraction block among the one or more extraction blocks comprising:
a residual scaler configured to adjust sizes of values subject to the skip connection; and
a normalization layer configured to adjust a range of result values of convolution operations performed in the plurality of convolution layers.

10. The image processing apparatus of claim 8, wherein the feature extraction network comprises one or more extraction blocks, each extraction block among the one or more extraction blocks comprising a first convolution layer and a second convolution layer,
wherein the skip connection is further configured to connect an input of the first convolution layer to an output of the second convolution layer.

11. The image processing apparatus of claim 1, wherein the processor is further configured to execute the one or more instructions to:
generate an upscaled feature map by up-scaling the output from each modulation block of the one or more modulation blocks; and
generate the output image based on the upscaled feature map.

12. A method of operating an image processing apparatus, the method comprising:
extracting feature information of an input image using a feature extraction network; and
generating an output image by processing the input image, by using an image quality processing network comprising one or more modulation blocks, wherein each modulation block among the one or more modulation blocks comprises:
a convolution layer performing a convolution operation between an input to the convolution layer and a kernel in the convolution layer and output a feature map based on the convolution operation,
a modulation layer receiving the feature map output from the convolution layer as input and generating a modulated feature map by modulating the feature map based on the feature information of the input image; and an activation layer receiving the modulated feature map and generating an output by applying an activation function to the modulated feature map.

13. The method of claim 12, wherein the feature information extracted by the feature extraction network comprises at least one of edge information of the input image, shadow area information of the input image, luminance information of the input image, transform noise information of the input image, or texture information of the input image.

14. The method of claim 12, wherein the generating of the modulated feature map comprises:
generating one or more weighted maps, based on the feature information of the input image; and
generating the modulated feature map by applying the one or more weighted maps to the feature map.

15. The method of claim 14, wherein the generating of the one or more weighted maps comprises generating the one or more weighted maps by performing a convolution operation and an activation function operation on the feature information of the input image.

16. The method of claim 14, wherein the one or more weighted maps comprises a first weighted map and a second weighted map, and
wherein the generating of the modulated feature map further comprises:
generating the modulated feature map by performing a first operation between the feature map and the first weighted map; and
performing a second operation between a result of the first operation and the second weighted map.

17. The method of claim 16, wherein the first operation is a multiplication operation and the second operation is an addition operation.

18. The method of claim 12, wherein the extracting of the feature information of the first image comprises extracting the feature information by performing a convolution operation and an activation function operation on the input image.

19. The method of claim 12, further comprising:
generating an upscaled feature map by up-scaling the output from each modulation block of the one or more modulation blocks; and
generating the output image based on the upscaled feature map.

20. A non-transitory computer-readable recording medium having stored therein a program configured to execute the method of claim 12.

* * * * *